(12) United States Patent  
Cochran

(10) Patent No.: US 6,721,902 B1
(45) Date of Patent: Apr. 13, 2004

(54) METHOD AND SYSTEM FOR PROVIDING LUN-BASED BACKUP RELIABILITY VIA LUN-BASED LOCKING

(75) Inventor: Robert Alan Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 561 days.

(21) Appl. No.: 09/687,338

(22) Filed: Oct. 12, 2000

(51) Int. Cl.[7] .................................................. G06F 11/00
(52) U.S. Cl. ........................................ 714/6; 714/13
(58) Field of Search .............................. 714/6, 7, 13, 42

(56) References Cited

U.S. PATENT DOCUMENTS

| | | | | |
|---|---|---|---|---|
| 5,893,919 A | * | 4/1999 | Sarkozy et al. | 711/114 |
| 5,987,566 A | * | 11/1999 | Vishlitzky et al. | 711/114 |
| 6,148,414 A | * | 11/2000 | Brown et al. | 714/9 |
| 6,167,531 A | * | 12/2000 | Sliwinski | 714/13 |
| 6,260,124 B1 | * | 7/2001 | Crockett et al. | 711/162 |
| 6,397,351 B1 | * | 5/2002 | Miller et al. | 714/13 |
| 6,467,023 B1 | * | 10/2002 | DeKoning et al. | 711/114 |
| 6,560,617 B1 | * | 5/2003 | Winger et al. | 707/204 |
| 2003/0074599 A1 | * | 4/2003 | Golasky et al. | 714/6 |

* cited by examiner

*Primary Examiner*—Scott Baderman
*Assistant Examiner*—Timothy M. Bonura

(57) ABSTRACT

A method and system for employing fast, but easily corrupted mass storage for reliably backing up objects, such as files and databases. In a LUN-based mass storage device, a system or application may request and receive a lock on a particular LUN prior to storing a backup object on the LUN. The system or application may later request lock information for the LUN in order to decide whether or not the backup object can be reliably used for a restore operation. If the system or application continues to hold a lock on the LUN, then the backup object is reliable.

15 Claims, 4 Drawing Sheets

METHOD AND SYSTEM FOR PROVIDING LUN-BASED BACKUP RELIABILITY VIA LUN-BASED LOCKING

TECHNICAL FIELD

The present invention relates to backup and incremental backup of objects stored on a mass storage device to backup mass storage devices, and, in particular, to a method for preventing potential corruption of backup mass storage devices by locking the mass storage devices.

BACKGROUND OF THE INVENTION

The present invention relates to backing up a primary data object stored on a mass storage device to backup copies of the primary data object stored on backup mass storage devices so that, if a primary data object is inadvertently deleted or corrupted during subsequent input/output ("I/O") operations, the primary data object can be restored to the mass storage device by copying a backup object to the mass storage device from a backup mass storage device. The present invention is described and illustrated with reference to an embodiment included in a disk array controller that services I/O requests from a number of remote computers. However, alternative embodiments of the present invention may be employed in controllers of many other types of storage devices as well as in a general electronic data storage application.

FIG. 1 is a block diagram of a standard disk drive. The disk drive 101 receives I/O requests from remote computers via a communications medium 102 such as a computer bus, fibre channel, or other such electronic communications medium. For many types of storage devices, including the disk drive 101 illustrated in FIG. 1, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ operation carried out by the storage device, data is returned via communications medium 102 to a remote computer, and as a result of a WRITE operation, data is received from a remote computer by the storage device via communications medium 102 and stored within the storage device.

The disk drive storage device illustrated in FIG. 1 includes controller hardware and logic 103 including electronic memory, one or more processors or processing circuits, and controller firmware, and also includes a number of disk platters 104 coated with a magnetic medium for storing electronic data. The disk drive contains many other components not shown in FIG. 1, including read/write heads, a high-speed electronic motor, a drive shaft, and other electronic, mechanical, and electromechanical components. The memory within the disk drive includes a request/reply buffer 105 which stores I/O requests received from remote computers and an I/O queue 106 that stores internal I/O commands corresponding to the I/O requests stored within the request/reply buffer 105. Communication between remote computers and the disk drive, translation of I/O requests into internal I/O commands, and management of the I/O queue, among other things, are carried out by the disk drive I/O controller as specified by disk drive I/O controller firmware 107. Translation of internal I/O commands into electromechanical disk operations in which data is stored onto, or retrieved from, the disk platters 104 is carried out by the disk drive I/O controller as specified by disk media read/write management firmware 108. Thus, the disk drive I/O control firmware 107 and the disk media read/write management firmware 108, along with the processors and memory that enable execution of the firmware, compose the disk drive controller.

Individual disk drives, such as the disk drive illustrated in FIG. 1, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data storage devices that can be efficiently accessed by numerous remote computers, disk manufacturers commonly combine many different individual disk drives, such as the disk drive illustrated in FIG. 1, into a disk array device, increasing both the storage capacity as well as increasing the capacity for parallel I/O request servicing by concurrent operation of the multiple disk drives contained within the disk array.

FIG. 2 is a simple block diagram of a disk array. The disk array 202 includes a number of disk drive devices 203, 204, and 205. In FIG. 2, for simplicity of illustration, only three individual disk drives are shown within the disk array, but disk arrays may contain many tens or hundreds of individual disk drives. A disk array contains a disk array controller 206 and cache memory 207. Generally, data retrieved from disk drives in response to READ requests may be stored within the cache memory 207 so that subsequent requests for the same data can be more quickly satisfied by reading the data from the quickly accessible cache memory rather than from the much slower electromechanical disk drives. Various elaborate mechanisms are employed to maintain, within the cache memory 207, data that has the greatest chance of being subsequently re-requested within a reasonable amount of time. The disk array controller 206 may also elect to store data received from remote computers via WRITE requests in cache memory 207 in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 208–215 provided by the disk array via internal disk drives 203–205 and the disk array controller 206. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass storage device, such as a disk array, a primary data object, such as a file or database, is normally backed up to backup copies of the primary data object on physically discrete mass storage devices or media so that if, during operation of the application or system, the primary data object becomes corrupted, inaccessible, or is overwritten or deleted, the primary data object can be restored by copying a backup copy of the primary data object from the mass storage device. Many different techniques and methodologies for maintaining backup copies have been developed. In one well-known technique, a primary data object is mirrored. FIG. 3 illustrates object-level mirroring. In FIG. 3, a primary data object "$O_3$" 301 is stored on LUN A 302. The mirror object, or backup copy, "$O_3$" 303 is stored on LUN B 304. The arrows in FIG. 3, such as arrow 305, indicate I/O write operations directed to various objects stored on a LUN. I/O write operations directed to object "$O_3$" are represented by arrow 306. When object-level mirroring is enabled, the disk array controller providing LUNs A and B automatically generates a second I/O write operation from each I/O write operation 306 directed to LUN A, and directs the second generated I/O write operation via path 307, switch "$S_1$" 308, and path 309 to the mirror object "$O_3$" 303 stored on LUN B 304. In FIG. 3, enablement of mirroring is logically represented by switch "$S_1$" 308 being on. Thus, when object-level mirroring is enabled, any I/O write operation, or any other type of I/O operation that changes the representation of object "$O_3$" 301 on LUN A, is automatically mirrored by the disk array controller to identically change the mirror object "$O_3$" 303. Mirroring can be disabled, represented in FIG. 3 by switch "$S_1$" 308 being in an off position. In that case, changes to the primary data object "$O_3$" 301 are no longer automatically reflected in the mirror object "$O_3$" 303. Thus, at the point that mirroring is disabled, the stored representation, or state, of the primary data object "$O_3$" 301 may diverge from the stored representation, or state, of the mirror object "$O_3$" 303. Once the primary and mirror copies of an object have diverged, the two copies can be brought back to identical representations, or states, by a resync operation represented in FIG. 3 by switch "$S_2$" 310 being in an on position. In the normal mirroring operation, switch "$S_2$" 310 is in the off position. During the resync operation, any I/O operations that occurred after mirroring was disabled are logically issued by the disk array controller to the mirror copy of the object via path 311, switch "$S_2$," and pass 309. During resync, switch "$S_1$" is in the off position. Once the resync operation is complete, logical switch "$S_2$" is disabled and logical switch "$S_1$" 308 can be turned on in order to reenable mirroring so that subsequent I/O write operations or other I/O operations that change the storage state of primary data object "$O_3$", are automatically reflected to the mirror object "$O_3$" 303.

FIG. 4 illustrates a common backup and incremental backup scheme that may be used for a primary data object stored within a disk array. In FIG. 4, the primary data object "$O_3$" 402 is stored in LUN A 404. At some discrete point in time, object "$O_3$" 402 is copied to a magnetic tape-based mass storage device to create a magnetic tape-based copy 406 of object "$O_{3_T}$." Copying an object to tape, and restoring an object from tape, are both time-consuming operations. Magnetic tape-based backup copies of an object are, however, reliably archivable and reliably available for restoration. Generally, tape backups are therefore made at comparatively lengthy intervals of time. At the same time that the magnetic tape-based backup copy 406 is made, or shortly thereafter, a disk-based backup copy "$O_{3_1}$" 407 can be made by mirroring the primary data object "$O_3$" 402 to a different LUN 408 or, equivalently, if mirror copy "$O_{3_1}$" 407 has previously been established and mirroring has been subsequently disabled, by resyncing mirror copy "$O_{3_1}$" 407 to the primary data object "$O_3$" 402. Once the mirror copy "$O_{3_1}$" 407 has been established, or resynced, mirroring can be disabled so that mirror copy "$O_{3_1}$" 407 is a snapshot in time of the state of primary data object "$O_3$" 402. The advantage of using a disk-based backup copy of primary data object "$O_3$" is that, should restoration be required, primary data object "$O_3$" 402 can be restored much more quickly from the disk-based backup copy "$O_{3_1}$" 407 than from the magnetic tape-based backup copy "$O_{3_T}$" 406. The mirror backup operation may be repeated at relatively shorter intervals of time than tape backups to provide incremental backup copies, such as incremental backup copies "$O_{3_2}$" 409 and "$O_{3_3}$" 410. In addition, of course, ongoing mirroring of object "$O_3$" 402 can be undertaken to provide a hot backup copy of primary data object "$O_3$" if the application or system requires immediate failover to a backup copy. If the primary data object "$O_3$" 402 is corrupted, becomes inaccessible, or is deleted, and if a mirrored failover copy is either not available or has become corrupted, inaccessible, or has been deleted, then the primary data object "$O_3$" can be restored from the most recently saved backup, such as backup copy "$O_{3_3}$" 410. If the most recently saved backup copy is corrupted, or inaccessible for some reason, then the next most recently saved backup copy "$O_{3_2}$" 409 can be used for restoring the primary data object, and so on, all the way back to the magnetic tape-based backup copy 406.

Although, as shown in FIG. 4, backup copies are often stored on different LUNS from the LUN on which the primary data object is stored, with the primary data object's LUN and the backup copies' LUNs all within a single disk array, mirroring operations can be implemented between a LUN provided by a first disk array and a LUN provided by a second disk array. Such systems involve additional complexity, but do not materially differ from the single-disk-array mirroring with respect to problems described in the next paragraph and with respect to various embodiments of the present invention, detailed below.

Unfortunately, disk-based backup copies may be corrupted by subsequent I/O write operations directed to the LUN on which the backup copy is stored. In many commonly-available disk arrays, once mirroring is disabled, or split, subsequent write I/O operations may change the state of the mirror copy. These subsequent I/O write operations may be accidentally generated by the application system that is using the mirror copy as a backup, or may be generated by other applications or systems. In these commonly-available disk arrays, the application or system is not guaranteed to have an uncorrupted and faithful representation of a primary data object at an earlier point of time following a restore operation from the backup copy of the primary data object taken at that point in time. In such systems, an application or system cannot reliably detect backup copies with accidental or inadvertent changes made by the application or system or by other applications and systems. Thus, application and systems designers and other users of disk arrays have recognized the need for a method and system for detecting subsequent changes to a stored object on a hard disk or other mass storage device following a point in time at which the stored object was created or updated to represent a backup copy of a primary data object stored on another mass storage device.

SUMMARY OF THE INVENTION

One embodiment of the present invention relates to facilitation of backing up primary data objects to, and restoring primary data objects from, mass storage devices. In many currently available mass storage devices, an application or system relying on a stored object, such as a file or database, as a backup object for use in restoring a primary data object cannot easily determine whether the backup object has been altered since the time that it was created or synchronized with the primary data object. In one embodiment of the present invention, a system or application can apply for and receive a lock on a particular LUN. The system or application can then store a backup object onto the locked LUN. Later, prior to employing the stored backup object in a restore operation, the system or application can determine whether the LUN is still locked by the system or application. If so, the system or application can continue with the restore operation using the backup object stored on the LUN. If, on the other hand, the system or application no longer holds a lock on the LUN, the system or application can use a slower, tape-based backup object for the restore operation. In a second embodiment of the present invention, a system or application can apply for and receive a timed lock on a particular LUN that expires after a period of time, selected by the system or application, that does not exceed a system-defined maximum period of time for holding a timed lock.

DETAILED DESCRIPTION OF THE INVENTION

The present invention is related to backup and incremental backup methodologies for primary data objects stored on mass storage devices. These methodologies generally create static backup copies of a dynamic primary data object, such as a file or database, at regular intervals, and maintain the static backup copies of the primary data object for a period of time during which they may be used to restore a corrupted, inaccessible, or deleted primary data object. Backup copies of a primary data object may be stored on readily accessed and written mass storage devices, such as hard disk drives, or on slower, difficult-to-access mass storage devices such as tape drives. Although backup and restore operations can be completed much more quickly when backup copies are stored on readily accessed and written mass storage devices, a backup copy stored on a hard disk drive may be accidentally or inadvertently corrupted or overwritten between the time the backup copy is created and the time that the backup copy is later needed to restore a primary data object. The slower, difficult-to-access, magnetic tape-based backup copies are much less likely to be corrupted. One embodiment of the present invention provides a method and system to an application or data storing and retrieving system for ensuring that the state of a LUN abstracting one or more hard disk drives has not been altered by I/O operations directed to the LUN between the time that a backup copy of a primary data object has been created or updated on the LUN and the time that the backup copy of the primary data object is needed by the application or data storing and retrieving system for restoring the primary data object.

Figure 1:
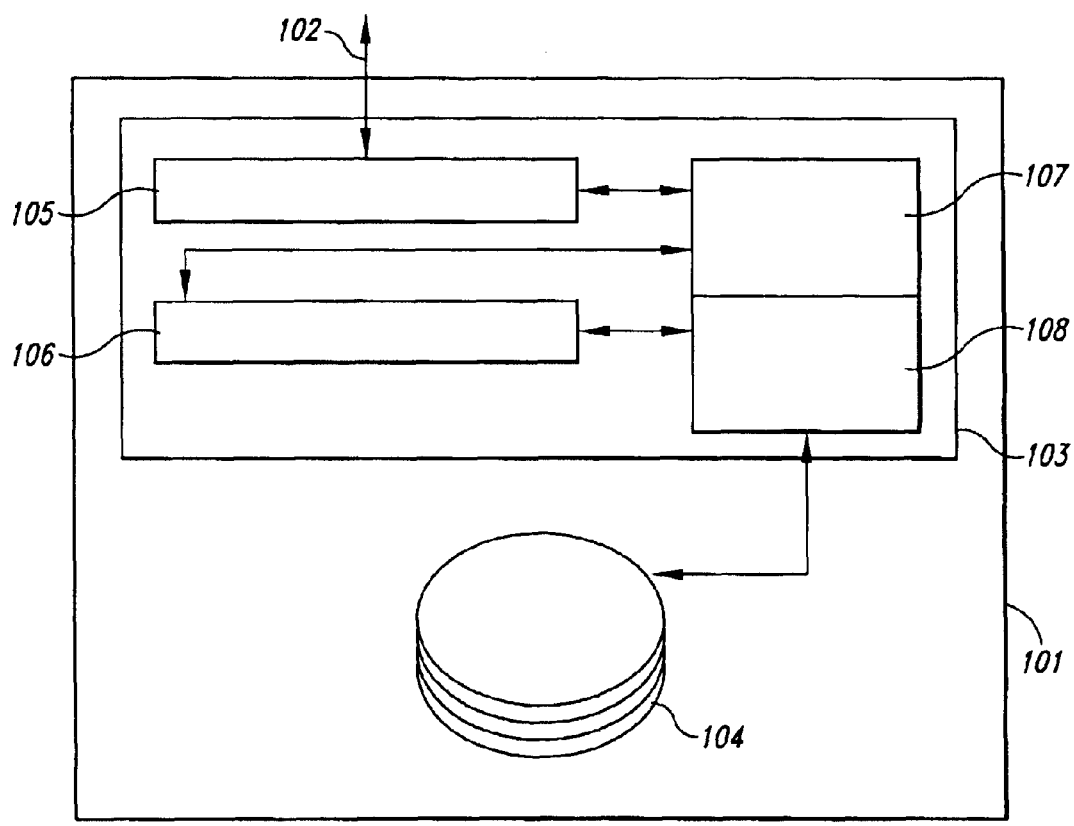
FIG. 1 is a block diagram of a standard disk drive.
Figure 2:
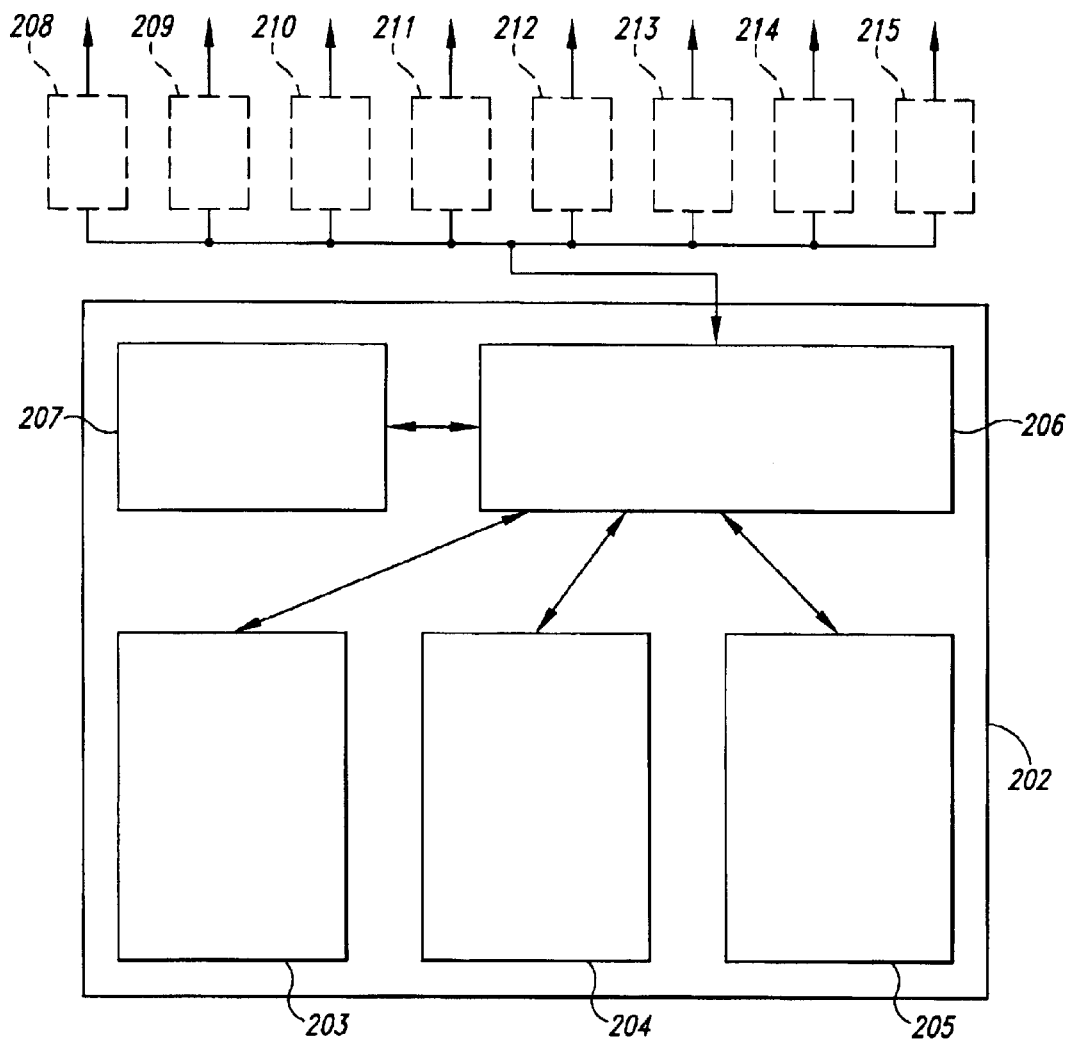
FIG. 2 is a simple block diagram of a disk array.
Figure 3:
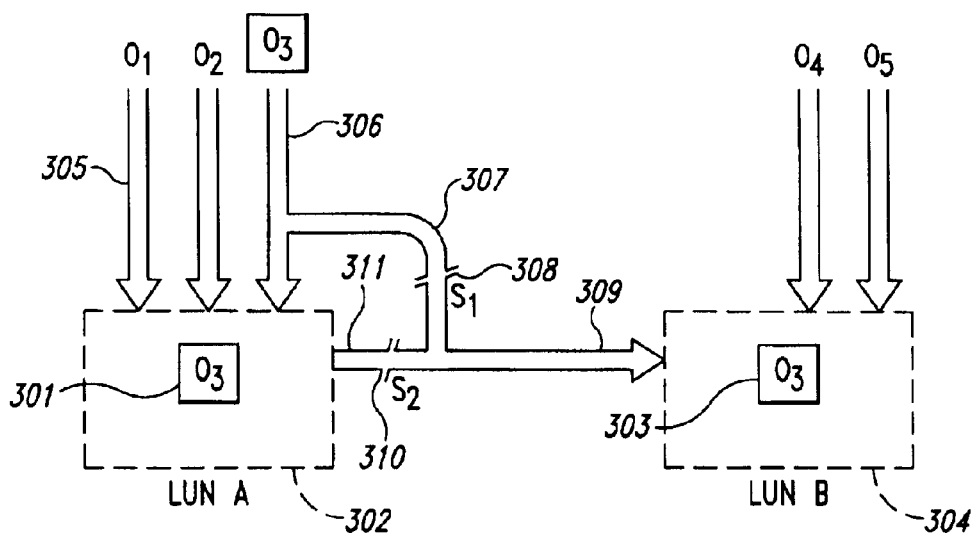
FIG. 3 illustrates object-level mirroring.
Figure 4:
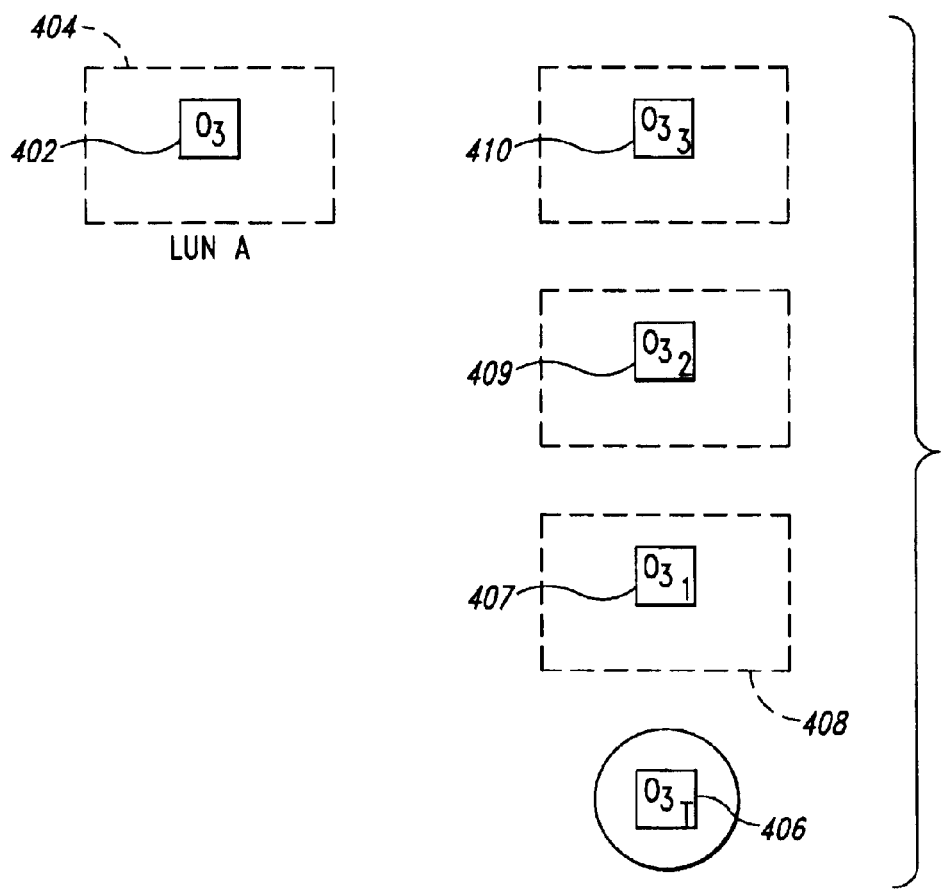
FIG. 4 illustrates a common backup and incremental backup scheme that may be used for a primary data object stored within a disk array.
Figure 5:
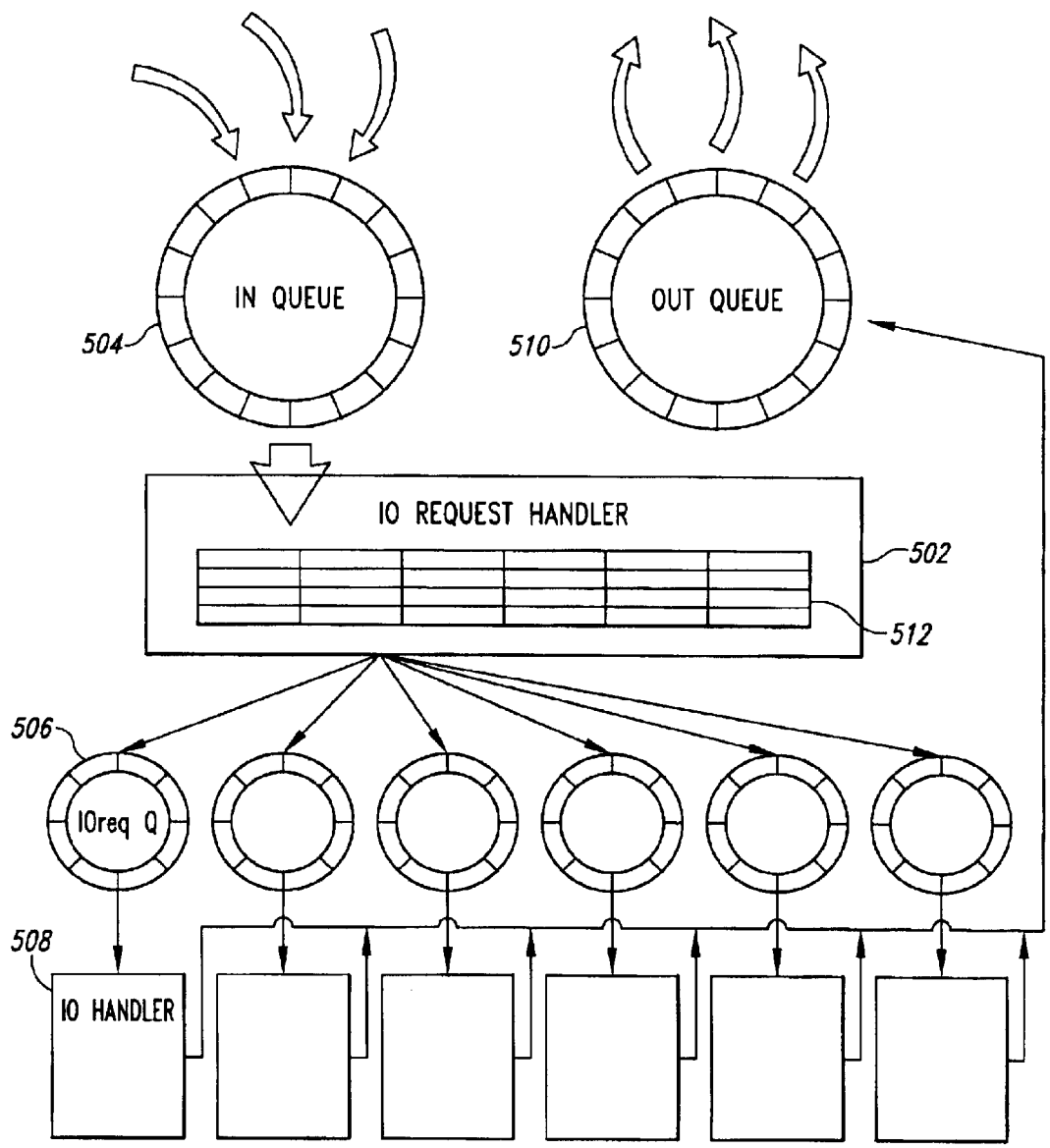
FIG. 5 illustrates organization and particular features of the C++-like pseudocode used to illustrate several embodiments of the present invention.

Several embodiments of the present invention are discussed, below, with reference to a C++-like pseudocode implementation of a disk array controller. FIG. 5 illustrates the overall organization and particular features of this C++-like pseudocode. The C++-like pseudocode includes several routines. The routine "IORequestHandler" 502 represents high-level processing by the disk array controller. This routine receives I/O requests from remote computers via an inbound queue "inQueue" 504 and distributes received I/O requests to intermediary queues, called "IOoreqQs" (for example, IOreqQ 506 in FIG. 5) associated with each LUN. For each LUN, a separate asynchronously executing thread executes the routine "IOHandler" (for example, IOhandler thread 508 in FIG. 5) that receives I/O requests from the intermediary queue associated with the thread, processes the I/O requests, and returns status and, in the case of a READ request, data to an outgoing queue "outQueue" 510.

The routine "IORequestHandler" 502 maintains numerous data structures 512 that contain a Boolean flag, a lock type, a timeout time, and host identifiers for each LUN provided by the disk array. The Boolean flag indicates whether or not the LUN is locked, the lock type indicates whether the lock is a breakable lock or a timed lock, the timeout time applies for a timed lock, and indicates the time at which the lock will expire, and the host identifier identifies the application or system which owns the lock, if the LUN is locked.

Note that the following C++-like pseudocode does not attempt to illustrate or describe all the various functionality of a disk array controller, but only that functionality related to the present invention. Note also that the present invention may implemented within a software program or routine running on a processor implementing a disk array controller, or controller in some other type of mass storage device, within a firmware implementation of a controller, or directly within logic circuits. The following C++-like pseudocode is provided for illustration purposes, and not to, in any way, limit the present invention to a particular type of implementation.

The C++-like pseudocode implementation illustrates implementation of portions of a single disk array controller related to the present invention. As noted above, a primary data object residing in a first disk array may be mirrored to a LUN provided by a second disk array. The embodiment described below provides a solution to potential corruption of a backup copy of a primary data object both in the case that the primary data object and backup are stored on different LUNs within a single disk array and in the case that the primary data object and backup are stored on different LUNs within two different disk arrays.

First, a number of enumerations and constants are provided, followed by a number of class declarations. Many of these classes contain no member functions, because no additional detail is necessary for the subsequent routine descriptions. In essence, they are stubs, or place holders, representing additional potential functionality that is unnecessary for description of the present invention. Other of the classes contain minimal member functions sufficient for description of the present invention. Note, however, that the C++-like pseudocode used to describe the present invention can be easily transformed into working C++ code by including member functions not provided in the C++-like pseudocode and by implementing the member functions. In the C++-like pseudocode, implementations of routines are only provided when necessary to describe the present invention.

```
18   class hostID
19   {
20   public:
21           bool   equalTo(hostID*);
22   };
23   class IOaddress
24   {
25   };
26   typedef struct inq {
27           bool      locked;
28           hostID    hd;
29           lock_type l;
30           time      t;
31   } INQUIRY;
32   class buffAddress
33   {
34   public:
35           operator =(INQUIRY*);
36   };
```

```
1   enum lock_type {BREAKABLE, TIMED};
2   enum IOCommand  {READ, WRITE, LUN_LOCKED GET_BREAKABLE_LUN_LOCK,
3                    GET_TIMED_LUN_LOCK, RELEASE_LUN_LOCK,
4                    LUN_LOCK_INQUIRY, GET_LOCK_FAILED,
5                    GET_LOCK_SUCCEEDED, RELEASE_LOCK_FAILED,
6                    RELEASE_LOCK_SUCCEEDED};
7   const int NULL = 0;
8   const int MAX_LOCK = 100;
9   const int NUM_LUNS = 4096;
```

The values of the enumeration "lock_type" on line 1, above, represent two types of locks supported in the C++-like pseudocode implementation: (1) BREAKABLE, a lock that may be broken either by the system or application that holds the lock, or by another system or application, via a RELEASE_LOCK command; and (2) TIMED, an unbreakable lock that automatically expires after a set period of time. The values of the enumeration "IOCommand" on lines 2–6, above, represent the basic I/O commands READ and WRITE, as well as commands directed to the disk array controller that provide locking functionality, and reply messages returned from the disk array controller to an application or system. These commands will be discussed, in detail, below. The constant "NULL" is defined to indicate null pointers. The constant "MAX_LOCK" represents the longest time for which a timed lock may be held. The constant "NUM_LUNS" is defined to represent the maximum number of LUNs that can be provided by a disk array.

```
10   class time
11   {
12   public:
13           int operator==(time);
14           int operator-(time);
15           int operator+(time);
16           int operator+(int);
17   };
```

An instance of the class "time," defined above, represents a particular time returned, for example, by a call to a system function that returns the current system time. The class "time" includes a number of operator members that allow for comparison of times, subtraction of times, addition of times, and addition of an integer representing some number of units of time, such as seconds, to an instance of the class "time."

An instance of the class "hostID" represents a unique identifier and address for a remote computer. The class "hostID" includes a member function "equalTo" that allows a hostID to be compared for equality to another hostID pointed to by the supplied argument. An instance of the class "IOaddress" represents the address of electronic data specified in an I/O request for READ or WRITE access. A structure of type "INQUIRY" is used to transfer lock information from a disk array controller back to a requesting application or system. An INQUIRY structure contains a Boolean field indicating whether or not a LUN is locked, a host ID representing the application or system that holds the lock, if the LUN is locked, a lock_type indicating the type of lock, and a time indicating when the lock will expire if the lock is of type "TIMED." The class "buffAddress" represents the address of a buffer that stores electronic data for transfer between remote computers and the disk array controller. The class "buffAddress" includes an operator that allows an instance of the class "buffAddress" to be initialized to the address of an INQUIRY structure.

```
1    class IOrequest
2    {
3    public:
4          hostID*      getHostID( );
5          void         setHostID(hostID*);
6          int          getLUN( );
7          void         setLUN(int);
8          IOCommand    getIOCommand( );
9          void         setIOCommand(IOCommand);
10         IOaddress    getIOaddress( );
11         void         setIOaddress( );
12         buffAddress  getBuffAddress( );
13         void         setBuffAddress(buffAddress);
```

```
14      int             getLength( );
15      void            setLength(int);
16  };
```

The class "IOrequest" encapsulates the various data that together compose an I/O request received from a remote computer that is serviced by the disk array controller. The class "IOrequest" includes the following member functions: (1) "getHostID," a function that returns a pointer to an object of the class "HostID" that represents the remote computer that generated the I/O request represented by the current instance of the class "IOrequest;" (2) "setHostID," a member function that sets the host ID of the I/O request represented by the current instance of the class "IOrequest" to the host ID pointed to by the supplied pointer argument; (3) "getLUN," a member function that returns the LUN to which the I/O request is addressed; (4) "setLUN," a member function that sets the LUN to which the I/O request is addressed; (5) "getIOCommand," a member function that returns one of the values enumerated in the enumeration "IOCommand" indicating the nature of the I/O request; (6) "setIOCommand," a member function that sets the I/O request to have a type equal to one of the values enumerated in the enumeration "IOCommand" to indicate the nature of the I/O request; (7) "getIOaddress," a member function that returns the address of the first electronic data to which the I/O request is targeted; (8) "IOaddress," a member function that sets the address of the first electronic data to which the I/O request is targeted; (9) "getBuffAddress," a member function that returns the address of the buffer that contains data for a WRITE operation or into which data is placed for a READ operation; (10) "setBuffAddress," a member function that sets the address of a buffer that contains data for a WRITE operation or into which data is placed for a READ operation; (11) "getLength," a member function that returns the length, or number of contiguous bytes, words, or blocks of data to be read or written during servicing of the I/O request; and (12) "setLength," a member function that sets the length, or number of contiguous bytes, words, or blocks of data to be read or written during servicing of the I/O request.

```
1   class IORequestQueue
2   {
3   public:
4       IOrequest*      getNext( );
5       void            queue(IQrequest*);
6       hostID          getHeadHost( );
7       bool            empty( );
8       bool            terminated( );
9       void            terminate( );
10  };
```

An instance of the class "IORequestQueue" serves as the inQueue (702 in FIG. 7). The class "IORequestQueue" contains the following member functions: (1) "getNext," a member function that dequeues and returns a pointer to the next I/O request on the queue; (2) "queue," a member function that queues an I/O request, pointed to by the single argument, to the queue; (3) "getHeadHost," a member function that returns the hostiD from the next I/O request within the queue to be dequeued from the I/O request queue; (4) "empty," a member function that returns a Boolean value indicating whether or not the I/O request queue is empty; (5) "terminated," a member function that returns a Boolean value indicating whether or not the I/O request queue has been terminated, or shut down; and (6) "terminate," a member function that shuts down, or terminates, the I/O request queue.

```
1   class IORequestQueueArray
2   {
3   public:
4       IORequestQueue* getQ(int);
5   };
```

An instance of the class "IORequestQueueArray" maintains a buffer of instances of the class "IORequestQueue" described above. These instances of the class "IORequestQueue" correspond to the IOreqQs (for example, IOreqQ 703 in FIG. 7) associated with threads executing the routine "IOHandler."

```
68  class IO_LUN
69  {
70  private:
71      static bool         locked[NUM_LUNS];
72      static lock_type    locks[NUM_LUNS];
73      static time         touts[NUM_LUNS];
74      static hostID       howns[NUM_LUNS];
75  public:
76      int                 getLUN( );
77      bool                getLocked( );
78      void                lock( );
79      void                unlock( );
80      hostID*             getOwnerHost( );
81      void                setOwnerHost(hostID*);
82      lock_type           getLockType( );
83      void                setLockType(lock_type tp);
84      time                getTimeOut( );
85      void                setTimeOut(time ti);
86  };
```

An instance of the class "IO_LUN" represents a particular LUN provided by a disk array. There are four static members associated with this class that represent information about locks held on particular LUNs, and that together compose data structure 512 of FIG. 5. The static member "lock" includes a Boolean flag for each LUN indicating whether or not the LUN is locked. The static member "locks" contains a value of the enumeration "lock_type," indicating the type of lock held for a particular LUN, for each LUN. The static member "touts" contains a time for each LUN locked with a timed lock indicating the time at which a timed lock will expire. Finally, the static member "howns" contains indications of the owners of the locks for each locked LUN. The class "IO_LUN" includes the following member functions: (1) "getLUN," a member function that returns an integer uniquely corresponding to the LUN described by an instance of IO_LUN; (2) "getLocked," a member function that returns a Boolean value indicating whether or not the LUN is locked; (3) "locked," a member function that locks the LUN; (4) "unlock," a member function that unlocks a LUN; (5) "getOwnerHost," a member function that returns a pointer to a host ID describing the owner of the lock; (6) "setOwnerHost," a member function that sets the owner of the lock for a particular LUN to an indication indicated by the supplied pointer argument; (7) "getLockType," a member function that returns an indication of the type of lock currently locking the LUN; (8) "setLockType," a member function that sets the type of lock currently locking a LUN to a particular lock type; (9) "getTimeOut," a member function that returns the time at which a timed lock will expire; and (10) "setTimeOut," a member function that sets the time at which a timed lock will expire.

```
87   class LUNs
88   {
89   public:
90           IO_LUN* getFirst( );
91           IO_LUN* getNext( );
92           IO_LUN* get(int);
93   };
```

An instance of the class "LUNs" represents the collection of LUNs provided by a disk array, and the member functions "getFirst" and "getNext" allow an instance of the class "IO_LUN" to be retrieved from the collection for each LUN provided by a disk array. The member function "get" returns a pointer to an IO_LUN corresponding to an ordinal indication for the LUN supplied as an argument.

```
94   class monitor
95   {
96   public:
97           voidwait( );
98           voidsignal( );
99   };
```

The class "monitor" represents an operating-system-like monitor that provides exclusivity for execution of code to one of a number of processes or threads running as part of the disk array controller. A process may call the member function "wait" in order to wait for exclusive control of a section of code and calls the member function "signal" at the end of an exclusive section of code to allow the next waiting process to begin executing the code. In the case where only a single IORequestHandler runs within the disk array controller, a monitor is unnecessary.

The routine "IORequestHandler" (502 in FIG. 5) represents high-level processing carried out by the disk array controller in order to implement one embodiment of the present invention:

```
1   void IORequestHandler    (IORequestQueue* inQueue,
2                            IORequestQueue* outQueue,
3                            LUNS* iluns)
4   {
5       IOrequest*           iorequest;
6       int                  LUN;
7       IO_LUN*              ilun;
8       IORequestQueueArray  IOReqQs;
9       monitor              lock_monitor;
10      int                  t;
11      time                 tm;
12      lock_type            l;
13      initialize(inQueue, outQueue);
14      ilun = iluns->getFirst( );
15      while (ilun != NULL)
16      {
17          LUN = ilun->getLUN( );
18          systemStartThread(IOhandler, IOReqQs.getQ(LUN), outQueue);
19          ilun = iluns->getNext( );
20      }
21      while (!inQueue->terminated( ) && !outQueue->terminated( ))
22      {
23          if (inQueue->empty( )) systemWaitOnQueueEvent(inQueue);
24          iorequest = inQueue->getNext( );
25          LUN = iorequest->getLUN( );
26          ilun = iluns->get(LUN);
27          if (ilun->getLocked( ))
28          {
29              lock_monitor.wait( );
30              if (ilun->getLockType( ) == TIMED &&
31                systemGetTime( ) > ilun->getTimeOut( ))
32              {
33                  ilun->unlock( );
34              }
35              lock_monitor.signal( );
36          }
37          if (iorequest->getIOCommand( ) == GET_BREAKABLE_LUN_LOCK)
38          {
39              lock_monitor.wait( );
40              if (ilun->getLocked( ))
41                  iorequest->setIOCommand(GET_LOCK_FAILED);
42              else
43              {
44                  ilun->setOwnerHost(iorequest->getHostID( ));
45                  ilun->setLockType(BREAKABLE);
46                  ilun->lock( );
47                  iorequest->setIOCommand(GET_LOCK_SUCCEEDED);
48              }
49              outQueue->queue(iorequest);
50              lock_monitor.signal( );
51      }
```

```
52          else if (iorequest->getIOCommand( ) == GET_TIMED_LUN_LOCK)
53          {
54              lock_monitor.wait( );
55              systemReadInt(iorequest->getBuffAddress( ), &t);
56              if (ilun->getLocked( ) || t > MAX_LOCK)
57                  orequest->setIOCommand(GET_LOCK_FAILED);
58              else
59              {
60                  ilun->setOwnerHost(iorequest->getHostID( ));
61                  ilun->setLockType(TIMED);
62                  ilun->lock( );
63                  ilun->setTimeOut(systemGetTime( ) + t);
64                  iorequest->setIOCommand(GET_LOCK_SUCCEEDED);
65              }
66              outQueue->queue(iorequest);
67              lock_monitor.signal( );
68          }
69          else if (iorequest->getIOCommand( ) == RELEASE_LUN_LOCK)
70          {
71              lock_monitor.wait( );
72              if (ilun->getOwnerHost( )->equalTo(iorequest->getHostID( ))
73                  || ilun->getLockType( ) == BREAKABLE)
74              {
75                  ilun->unlock( );
76                  iorequest->setIOCommand(RELEASE_LOCK_SUCCEEDED);
77              }
78              else
79                  iorequest->setIOCommand(RELEASE_LOCK_FAILED);
80              outQueue->queue(iorequest);
81              lock_monitor.signal( );
82          }
83          else if (iorequest->getIOCommand( ) == LUN_LOCK_INQUIRY)
84          {
85              lock_monitor.wait( );
86              systemWrite(iorequest->getBuffAddress( ),
87                      ilun->getLocked( ), sizeof (bool),
88                      ilun->getOwnerHost( ), sizeof (hostID),
89                      &(l = ilun->getLockType( )), sizeof (lock_type),
90                      &(tm = ilun->getTimeout( )), sizeof(time));
91              outQueue->queue(iorequest);
92              lock_monitor.signal( );
93          }
94          else if (iorequest->getIOCommand( ) == WRITE &&
95              ilun->getLocked( ) &&
96              !ilun->getOwnerHost( )->equalTo(iorequest->getHostID( )))
97          {
98              iorequest->setIOCommand(LUN_LOCKED);
99              outQueue->queue(iorequest);
100         }
101         else IOReqQs.getQ(LUN)->queue(iorequest);
102     }
103     if (!outQueue->terminated( ))
104     {
105         ilun = iluns->getFirst( );
106         LUN = ilun->getLUN( );
107         while (ilun != NULL)
108         {
109             IOReqQs.getQ(LUN)->terminate( );
110             ilun = iluns->getNext( );
111             LUN = ilun->getLUN( );
112         }
113         outQueue->terminate( );
114     }
115     else if (!inQueue->terminated( )) inQueue->terminate( );
116 }
```

The routine "IORequestHandler" receives pointers to the inQueue (504 in FIG. 5), the outQueue (510 in FIG. 5), and a container "iluns" that contains instances of the class "IO_LUN" for each LUN provided by the disk array controller. On line 13, IORequestHandler calls a routine "initialize" to carry out any initialization operations on the I/O queues. These initialization operations are, for the most part, dependent on implementations of other portions of the disk array controller that are beyond the scope of the present invention, and are therefore not described in an implementation the routine "initialize."

On lines 14–20, IORequestHandler extracts each instance of the class "IO_LUN" from the container pointed to by the pointer "iluns" in order to start a thread executing the routine "IOHandler" for the LUN represented by the extracted instance of the class "IO_LUN." Thus, on lines 14–20, IORequestHandler starts execution of a separate instance of the routine "IOHandler" for each LUN.

The bulk of the processing carried out by IORequestHandler occurs in the loop comprising lines 21–102. This loop is terminated only when one or both of the inQueue and outQueue (504 and 510 in FIG. 5, respectively) are terminated. On line 23, IORequestHandler checks to see if the inQueue is empty and, if so, calls a system function "systemWaitOnQueueEvent" to wait until an I/O request is queued to the inQueue. Once a next I/O request is available for processing, IORequestHandler dequeues that I/O request from the inQueue, on line 24, and extracts an integer "LUN" representing the LUN to which the I/O request is directed on line 25. On line 26, IORequestHandler obtains a pointer to an IO_LUN object that represents the LUN to which the IORequest is directed. On line 27, IORequestHandler calls the IO_LUN member function "getLocked" to determine whether or not the LUN is currently locked. If so, and if the lock is a timed lock that has expired, as determined by IORequestHandler on lines 30–31, then, on line 33, IORequestHandler explicitly unlocks the LUN via a call to IO_LUN member function "unlock." Next, in a series of if, else if, and else statements, IORequestHandler determines the nature or type of the I/O request, and handles the I/O request accordingly. If the I/O request is "GET_BREAKABLE_LUN_LOCK," as determined by IORequestHandler on line 37, then if the LUN is already locked, as determined by IORequestHandler on line 40, IORequestHandler sets a reply type "GET_LOCK_FAILED" in an I/O request object to be forwarded to the outQueue for transmission back to the requesting application or system. Otherwise, on lines 44–46, IORequestHandler locks the LUN according to the request and places a reply type "GET_LOCK_SUCCEEDED" into an I/O request for queuing to the outQueue. On line 49, the return I/O request is queued to the outQueue. If the received I/O request was of type "GET_TIMED_LUN_LOCK," as determined by IORequestHandler on line 52, then, on line 55, IORequestHandler extracts the requested time for the timed lock from the received I/O request and, as detected on line 56, if the requested time is greater than the maximum allowable time for timed lock, IORequestHandler sets up an I/O request with an "GET_LOCK_FAILED" reply type to return to the requesting application or system on line 57. Otherwise, on lines 59–64, IORequestHandler locks the LUN according to the request and sets up an I/O request with the return type "GET_LOCK_SUCCEEDED." The I/O request is queued to the outQueue on line 66. If the received I/O request is of type "RELEASE_LUN_LOCK" as detected by IORequestHandler on line 69, then if the requesting system or application currently holds the lock or if the lock is breakable, as detected by IORequestHandler on lines 72–73, then IORequestHandler unlocks the lock on line 75 and prepares an I/O request object with the reply type "RELEASE_LOCK_SUCCEEDED" to return to the requesting system or application. Otherwise, IORequestHandler prepares a return I/O request with the reply type "RELEASE_LOCK_FAILED" on line 79. The I/O request to return to the requesting system or application is queued to the outQueue on line 80. If the received I/O request is of type "LUN_LOCK_INQUIRY," as detected by IORequestHandler on line 83, then, on lines 86–90, IORequestHandler writes lock information into the buffer associated with an I/O request and queues the I/O request to the outQueue on line 91 to return to the requesting system or application. If the received I/O request is a WRITE command, as detected on line 94 by IORequestHandler, and if the LUN is locked and the requesting system or application does not own the lock, as further detected by IORequestHandler on lines 95 and 96, then IORequestHandler returns an I/O request to the requesting system or application with the reply type "LUN_LOCKED." On line 101, IORequestHandler forwards any other type of I/O request to the appropriate IOreqQ for the LUN to which it is directed. Finally, on lines 103–115, once one or both of the inQueue and outQueue are terminated, IORequestHandler terminates all of the IOreqQ queues and thus terminates all of the I/O handler threads launched in the while-loop comprising lines 14–20.

That the I/O request protocol in the above implementation is quite simple. Normally, a much more elaborate protocol is employed, but the C++-like pseudocode is meant to illustrate the LUN-based timestamping functionality, rather than the I/O request protocols. Note also that the details of message addressing, buffer addressing, and message transmission are abstracted in the class "I/ORequestQueue."

Next, a number of trivial implementations for IO_LUN member functions are provided, without further comment:

```
1   bool IO_LUN::getLocked( )
2   {
3           return    locked[getLUN( )];
4   }
5   void IO_LUN::lock( )
6   {
7           locked[getLUN( )] = true;
8   }
9   void IO_LUN::unlock( )
10  {
11          locked[getLUN( )] = false;
12  }
13  lock_typeIO_LUN::getLockType( )
14  {
15          return locks[getLUN( )];
16  }
17  void IO_LUN::setLockType(lock_type tp)
18  {
19          locks[getLUN( )] = tp;
20  }
21  time IO_LUN::getTimeOut( )
22  {
23          return touts[getLUN( )];
24  }
25  void IO_LUN::setTimeOut(time ti)
26  {
27          touts[getLUN( )] = ti;
28  }
```

Finally, C++-like pseudocode for the routine "hostCode" is provided. This routine represents a host computer, application, or system that creates a backup copy of a primary data object on a separate LUN that the host computer, application, or system first locks. The host computer, application, or system requests lock information to decide whether or not to use the backup copy for restoration of the primary data object. Note that many steps in this routine are described textually, as C++ comments, since their implementation is beyond the scope of the present invention.

```
1   void hostCode (IQRequestQueue* inQueue, IORequestQueue* OutQueue)
2   {
3       hostID*    hd;
4       int        M_LUN;
5       IOrequest* iorequest = new IOrequest;
6       IOrequest* resp;
7       INQUIRY    iq;
8       buffAddress bfA;
9       boot       notReturned = true;
10      // determine an object to back up
11      // determine a primamry LUN and mirror LUN locations of the object
12      // set M_LUN = mirror LUN
13      bfA = &iq;
14      iorequest->setHostID(hd);
15      iorequest->setLUN(M_LUN);
16      iorequest->setIOCommand(GET_BREAKABLE_LUN_LOCK);
17      outQueue->queue(iorequest);
18      while (notReturned)
19      {
20          if (inQueue->empty( )) systemWaitOnQueueEvent(inQueue);
21          resp = inQueue->getNext( );
22          if (resp->getIOCommand( ) == GET_LOCK_SUCCEEDED ||
23             resp->getIOCommand( ) == GET_LOCK_FAILED)
24          {
25              if (resp->getIOCommand( ) == GET_LOCK_SUCCEEDED)
26              {
27                  delete resp;
28                  // if the primary LUN and mirror LUN are split,
29                  //    resync them
30                  // split the primary LUN and mirror LUN
31                  // backup object to tape
32                  //
33                  //
34                  // determine that a restore of object is needed
35                  iorequest->setIOCommand(LUN_LOCK_INQUIRY);
36                  iorequest->setBuffAddress(bfA);
37                  outQueue->queue(iorequest);
38                  while (notReturned)
39                  {
40                      if (inQueue->empty( ))
41                          systemWaitOnQueueEvent(inQueue);
42                      resp = inQueue->getNext( );
43                      if (resp->getIOCommand( ) == LUN_LOCK_INQUIRY)
44                      {
45                          if (iq.locked && iq.hd.equalTo(hd))
46                          {
47                              // restore object from mirror LUN
48                          }
49                          else
50                          {
51                              // restore object from tape
52                          }
53                          notReturned = false;
54                          delete resp;
55                      }
56                      else
57                      {
58                          // handle returned IO request
59                      }
60                  }
61              }
62              else
63              {
64                  // use a different LUN for mirror, break lock
65                  // if lock breakable, etc.
66              }
67          }
68          else
69          {
70              // handle returned IO request
71          }
72      }
```

The routine "hostCode" assumes that an object resident on a first LUN that will be backed up is already mirrored on a second LUN. On lines 10–12, C++ comments include initial steps that hostCode takes to backup a particular primary data object that is already mirrored. First, the primary data object to be backed up is identified, and the LUNs on which the primary data object and its mirror are stored are identified. The variable "M_LUN" is set to the integer value identifying the LUN which the mirrored object is stored.

Next, on lines 13–17, the routine "hostCode" sets up an I/O request requesting a breakable lock and queues that I/O request to the outQueue. The while-loop comprising lines 18–71 represents continued looping in order to receive the reply to the issued I/O command "GET_BREAKABLE_LUN_LOCK." Once that reply is received, as detected by hostCode on lines 22–23, then if hostCode succeeded in obtaining a breakable lock, as detected by hostCode on line 25, hostCode resyncs the primary data object and its mirror in the case that mirroring is currently disabled, or split, and then splits the primary data object from its mirror. At this point, the mirror object becomes the backup copy that can be later used to restore the primary data object in the event that the primary data object is corrupted or lost.

As represented by the blank comment lines 32–33, host-Code may carry out any number of different activities, including issuing I/O requests to various devices, communicating with other processes, and other such tasks. At some later point, as indicated on line 34, hostCode may determine that the object previously backed up may now need to be restored. This may be indicated by failed I/O requests directed to the object, by notification from an operating system or network services server that the LUN on which the primary data object is stored has failed, and by many other means. On lines 35–45, hostCode issues a "LUN_LOCK INQUIRY" command to the disk array and loops until receiving a response. If the response indicates that hostCode still owns the lock on the LUN, as detected by hostCode on line 45, then hostCode restores the object from the mirror LUN as indicated on line 47. Otherwise, hostCode restores the object from tape, as indicated on line 52.

As shown in the above C++-like pseudocode implementation, LUN-based locking provides a means for a remote computer, an application, or a system to determine whether a backup copy residing on a LUN may have been potentially corrupted or otherwise altered by another remote computer, an application, or a system. When a remote computer, application, or system undertakes a restore operation from a backup LUN, the remote computer, application, or system can, in the case of a breakable lock, determine whether or not the remote computer, application, or system continues to hold a lock on the backup LUN, or, in the case of a timed lock, determine whether the timed lock has expired, in order to decide whether or not to restore from the backup LUN, or to restore from a slower, more difficultly accessed tape-based backup.

The above C++-like pseudocode implementation, particularly the routine "hostCode," employed a breakable lock in order to guarantee reliability of a mirrored backup object stored on a LUN. However, timed locks may also be used. In the case of an unbreakable timed lock, the requesting application or system is guaranteed that, if the application or system uses the mirror backup copy prior to expiration of the timed lock, the backup copy will not have been altered or corrupted. By providing additional functionality, not shown in the above pseudocode, the disk array controller may allow a timed lock holder to re-request a timed lock providing that no other system or application has registered an intent to break the timed lock. Additionally, a disk array controller might allow systems or applications to reserve timed locks in advance. In a more complex embodiment, timed locks may be breakable, but only by a remote computer, application, or system that has obtained heightened authorization. For example, a super user might be allowed to break a timed lock. In this embodiment, a system or application holding a timed lock would need to verify that it continues to hold the timed lock prior to concluding that the LUN on which the timed lock was taken has not been altered since the lock was taken.

Although the present invention has been described in terms of a particular embodiment, it is not intended that the invention be limited to this embodiment. Modifications within the spirit of the invention will be apparent to those skilled in the art. For example, portions of the present invention may be incorporated into electronic circuitry, firmware, or software depending on the implementation of the storage device controller that incorporates the present invention. The C++-like pseudocode, provided above, is meant only for illustration and is not in any way intended to limit to constrain the almost limitless number of implementations possible for the present invention. LUN-based locks were implemented using particular static member data structures in the IO_LUN class, but an almost limitless number of alternative methods for implementing locks are possible. More elaborate locks may include queues on which systems or applications may wait for locks, and more complex lock breaking protocols can be used to protect lock holders from possible overriding, altering, or corruption of stored backup copies.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method employed by a computer-based entity for backing up a computer-readable object stored on a first logical device unit, the method comprising:

obtaining by the computer-based entity a lock on a second logical device unit;

when a mirror for the object has not yet been created on the second logical device, creating a mirror for the object on the second logical device unit implemented on one or more mass storage devices;

when the object and the mirror for the object are split, resyncing the object with the mirror for the object;

splitting the object and the mirror for the object so that the mirror becomes a backup copy of the object and so that I/O requests directed to the object are not automatically directed to the mirror;

when the object is determined to need to be restored from the mirror, retrieving lock information from the second logical device unit, including an indication of whether or not a lock is currently held on the second logical device unit, and, when a lock is currently held on the second logical device unit, an indication of the owner of the lock;

when, as determined from the indication of the owner of the lock, the computer-based entity holds a lock on the second logical device unit, using the mirror to create, replace, or update the object on the first logical device.

2. The method of claim 1 further including copying the object to a second backup copy on a difficult-to-modify mass storage device after splitting the object and the mirror for the object.

3. The method of claim 2 further including, when the object is determined to need to be restored from the mirror and when the computer-based entity does not hold a lock on the second logical device, copying the second backup copy from the difficult-to-modify mass storage device to the first logical device to replace or again create the object on the first logical device.

4. The method of claim 3 wherein the one or more mass storage devices are hard disk drives and the difficult-to-modify mass storage device is a tape drive.

5. The method of claim 3 wherein the first and second logical units are provided by one or more disk array controllers, wherein data stored to the first and second logical units are stored by the one or more disk array controllers on one or more hard disk drives, and wherein the one or more disk array controllers provide locks to requesting computer-based entities.

6. The method of claim 1 wherein the lock on the second logical device unit is a breakable lock that can be broken by a second computer-based entity.

7. The method of claim 1 wherein a computer-based entity may include:

a remote computer;

an application program; and a system.

8. A method employed by a computer-based entity for backing up a computer-readable object stored on a first logical device unit, the method comprising:

obtaining by the computer-based entity a timed lock on a second logical device unit that expires after a specified amount of time;

when a mirror for the object has not yet been created on the second logical device, creating a mirror for the object on the second logical device unit implemented on one or more mass storage devices;

when the object and the mirror for the object are split, resyncing the object with the mirror for the object;

splitting the object and the mirror for the object so that the mirror becomes a backup copy of the object and so that I/O requests directed to the object are not automatically directed to the mirror;

when the object is determined to need to be restored from the mirror, when the timed lock is still unexpired, using the mirror to create, replace, or update the object on the first logical device.

9. The method of claim 8 further including copying the object to a second backup copy on a difficult-to-modify mass storage device after splitting the object and the mirror for the object.

10. The method of claim 9 further including, when the object is determined to need to be restored from the mirror and when the timed lock has expired, copying the second backup copy from the difficult-to-modify mass storage device to the first logical device to replace or again create the object on the first logical device.

11. The method of claim 10 wherein the one or more mass storage devices are hard disk drives and the difficult-to-modify mass storage device is a tape drive.

12. The method of claim 10 wherein the first and second logical units are provided by one or more disk array controllers, wherein data stored to the first and second logical units are stored by the one or more disk array controllers on one or more hard disk drives, and wherein the one or more disk array controllers provide locks to requesting computer-based entities.

13. The method of claim 8 wherein the lock on the second logical device unit is an unbreakable lock that cannot be broken by a second computer-based entity.

14. The method of claim 1 wherein a computer-based entity may include:

a remote computer;

an application program; and a system.

15. A mass storage device that provides logical device units to accessing computers, the mass storage device comprising:

a medium for storing data;

data writing and reading devices for writing data to the medium and reading data from the medium;

memory and logic processing components; and a controller that executes within a logic processing component and controls reading and writing of data to and from the memory and to and from the medium, the controller providing, in addition to execution of I/O operations to and from logical device units comprising portions of the medium for storing data, mirroring of an object stored on a first logical device unit to a mirror object stored on a second logical device unit and providing, to requesting remote computers, applications, and systems, unbreakable locks on logical device units.

* * * * *